United States Patent
Aravamudan et al.

(10) Patent No.: US 12,169,496 B2
(45) Date of Patent: *Dec. 17, 2024

(54) METHOD AND SYSTEM FOR CAPTURING AND EXPLOITING USER INTENT IN A CONVERSATIONAL INTERACTION BASED INFORMATION RETRIEVAL SYSTEM

(71) Applicant: Adeia Guides Inc., San Jose, CA (US)

(72) Inventors: Murali Aravamudan, Andover, MA (US); Sashikumar Venkataraman, Andover, MA (US); Rakesh Barve, Bangalore (IN); Ahmed Nizam Mohaideen Pathurudeen, Kovilpatti (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,347

(22) Filed: Dec. 15, 2020

(65) Prior Publication Data

US 2021/0173834 A1   Jun. 10, 2021

Related U.S. Application Data

(63) Continuation of application No. 15/913,609, filed on Mar. 6, 2018, now Pat. No. 10,896,184, which is a (Continued)

(51) Int. Cl.
*G06F 16/2457* (2019.01)
*G06F 16/95* (2019.01)

(52) U.S. Cl.
CPC .......... *G06F 16/2457* (2019.01); *G06F 16/95* (2019.01)

(58) Field of Classification Search
CPC ................. G06F 16/95; G06F 16/2457; G06F 17/30522; G06F 17/30861
(Continued)

(56) References Cited

U.S. PATENT DOCUMENTS

| 4,138,719 A | 2/1979 | Swanstrom et al. |
| 4,509,133 A | 4/1985 | Monbaron |

(Continued)

FOREIGN PATENT DOCUMENTS

| BR | 102014010766 A2 | 12/2015 |
| JP | H06266779 | 9/1994 |

(Continued)

OTHER PUBLICATIONS

Kumar Ashwani, et al., Reference resolution as a facilitating process towards robust multimodal dialogue management: A cognitive grammar approach, Jan. 1, 2003, 8 pages.
(Continued)

*Primary Examiner* — Kuen S Lu
(74) *Attorney, Agent, or Firm* — HALEY GUILIANO LLP

(57) ABSTRACT

Systems and methods are disclosed for processing a search request received from a user. A method includes providing access to content items associated with metadata. The method includes providing information about at least one search previously performed for a user, and providing access to information describing relationships between at least one of the content items and the metadata. The method includes receiving a present input from the user intended to identify a desired content item. Upon determining that results from the previous search did not satisfy the search request from the user, the method includes determining an intent shared by the previous search and the present input based on comparing (i) the relationship information, (ii) the previous
(Continued)

search, and (iii) the present input. The method also includes selecting and presenting a subset of content items based on comparing the shared intent and the metadata.

20 Claims, 8 Drawing Sheets

Related U.S. Application Data continuation of application No. 14/274,147, filed on May 9, 2014, now Pat. No. 9,946,757.

(60) Provisional application No. 61/822,098, filed on May 10, 2013.

(58) Field of Classification Search
USPC .......................................................... 707/775
See application file for complete search history.

(56) References Cited

U.S. PATENT DOCUMENTS

| | | | |
|---|---|---|---|
| 5,859,972 A | 1/1999 | Subramaniam et al. |
| 5,960,394 A | 9/1999 | Gould et al. |
| 6,006,225 A | 12/1999 | Bowman et al. |
| 6,014,665 A | 1/2000 | Culliss |
| 6,021,403 A | 2/2000 | Horvitz et al. |
| 6,064,960 A | 5/2000 | Bellegarda |
| 6,092,043 A | 7/2000 | Squires et al. |
| 6,125,345 A | 9/2000 | Modi et al. |
| 6,144,958 A | 11/2000 | Ortega |
| 6,195,635 B1 | 2/2001 | Wright |
| 6,256,664 B1 | 7/2001 | Donoho |
| 6,272,455 B1 | 8/2001 | Hoshen et al. |
| 6,317,708 B1 | 11/2001 | Witbrock et al. |
| 6,408,293 B1 | 6/2002 | Aggarwal |
| 6,671,681 B1 | 12/2003 | Emens et al. |
| 6,718,324 B2 | 4/2004 | Edlund et al. |
| 6,856,986 B1 | 2/2005 | Rossides |
| 7,130,923 B2 | 10/2006 | Mason |
| 7,308,404 B2 | 12/2007 | Venkataraman et al. |
| 7,346,549 B2 | 3/2008 | Deas et al. |
| 7,610,199 B2 | 10/2009 | Abrash et al. |
| 7,668,865 B2 | 2/2010 | McDonald |
| 7,716,229 B1 | 5/2010 | Srivastava et al. |
| 7,725,321 B2 | 5/2010 | Bennett |
| 7,856,441 B1 | 12/2010 | Kraft et al. |
| 7,912,701 B1 | 3/2011 | Gray et al. |
| 7,930,168 B2 | 4/2011 | Weng et al. |
| 8,005,679 B2 | 8/2011 | Jordan et al. |
| 8,046,348 B1 | 10/2011 | Rehling et al. |
| 8,086,489 B2 | 12/2011 | Ramakrishna |
| 8,156,129 B2 | 4/2012 | Zhou |
| 8,156,138 B2 * | 4/2012 | Kohn .................... G06Q 30/02 707/769 |
| 8,271,323 B2 | 9/2012 | Chatow et al. |
| 8,417,718 B1 | 4/2013 | Finkelstein et al. |
| 8,494,853 B1 | 7/2013 | Mengibar et al. |
| 8,504,562 B1 | 8/2013 | Ikeda |
| 8,515,985 B1 | 8/2013 | Zhou |
| 8,583,670 B2 | 11/2013 | Cameron et al. |
| 8,600,980 B2 | 12/2013 | Jensen |
| 8,713,042 B1 | 4/2014 | Zinenko et al. |
| 8,725,180 B2 | 5/2014 | Lee et al. |
| 8,725,569 B2 | 5/2014 | Liang et al. |
| 8,756,216 B1 | 6/2014 | Ramesh et al. |
| 8,805,823 B2 | 8/2014 | Nitz |
| 8,812,534 B2 | 8/2014 | Platt et al. |
| 8,880,423 B2 | 11/2014 | Zhang |
| 8,903,793 B2 | 12/2014 | Bangalore |
| 8,930,189 B2 | 1/2015 | Cath et al. |
| 8,954,318 B2 | 2/2015 | Barve |
| 8,972,388 B1 | 3/2015 | Finkelstein et al. |
| 9,009,046 B1 | 4/2015 | Stewart |
| 9,020,110 B1 | 4/2015 | Baharav et al. |
| 9,031,216 B1 | 5/2015 | Kamvar et al. |
| 9,183,183 B2 | 11/2015 | Barve |
| 9,355,191 B1 | 5/2016 | Finkelstein et al. |
| 9,424,233 B2 | 8/2016 | Barve |
| 9,465,833 B2 | 10/2016 | Aravamudan |
| 9,477,643 B2 | 10/2016 | Barve |
| 9,514,497 B2 | 12/2016 | Baharav et al. |
| 9,542,482 B1 | 1/2017 | Sachan |
| 9,547,832 B2 | 1/2017 | Gordon |
| 9,582,515 B1 | 2/2017 | Doubleday et al. |
| 9,785,976 B2 | 10/2017 | Guo et al. |
| 9,799,328 B2 | 10/2017 | Aravamudan et al. |
| 10,115,146 B1 | 10/2018 | Anderson et al. |
| 10,140,982 B2 | 11/2018 | Aravamudan et al. |
| 10,341,447 B2 | 7/2019 | Kelly |
| 10,475,060 B2 | 11/2019 | Carlson et al. |
| 10,482,674 B1 | 11/2019 | Wu et al. |
| 10,795,886 B1 | 10/2020 | Samdani et al. |
| 10,896,184 B2 | 1/2021 | Aravamudan |
| 11,017,411 B2 | 5/2021 | Macilwaine et al. |
| 11,295,730 B1 | 4/2022 | Mohajer et al. |
| 11,423,074 B2 | 8/2022 | Venkataraman et al. |
| 11,811,889 B2 | 11/2023 | Kelly et al. |
| 11,847,151 B2 | 12/2023 | Aravamudan et al. |
| 11,991,257 B2 | 5/2024 | Kelly et al. |
| 11,997,176 B2 | 5/2024 | Kelly et al. |
| 2001/0049688 A1 | 12/2001 | Fratkina et al. |
| 2002/0040320 A1* | 4/2002 | Tanaka ................ G06F 16/9577 |
| 2002/0055916 A1 | 5/2002 | Jost et al. |
| 2002/0059069 A1 | 5/2002 | Hsu et al. |
| 2002/0065813 A1 | 5/2002 | Scanlon et al. |
| 2002/0173956 A1 | 11/2002 | Hartley et al. |
| 2003/0069879 A1 | 4/2003 | Sloan et al. |
| 2003/0188307 A1 | 10/2003 | Mizuno |
| 2004/0243557 A1 | 12/2004 | Broder et al. |
| 2005/0049852 A1 | 3/2005 | Chao |
| 2005/0080613 A1 | 4/2005 | Colledge et al. |
| 2005/0246740 A1 | 11/2005 | Teraci et al. |
| 2005/0283468 A1 | 12/2005 | Kamvar et al. |
| 2006/0110711 A1 | 5/2006 | Julia et al. |
| 2006/0112091 A1 | 5/2006 | Chapman et al. |
| 2006/0206326 A1 | 9/2006 | Fukada |
| 2006/0206454 A1 | 9/2006 | Forstall et al. |
| 2007/0005570 A1 | 1/2007 | Hurst-Hiller et al. |
| 2007/0050339 A1 | 3/2007 | Kasperski et al. |
| 2007/0060099 A1 | 3/2007 | Ramer et al. |
| 2007/0061245 A1 | 3/2007 | Ramer et al. |
| 2007/0061334 A1 | 3/2007 | Ramer et al. |
| 2007/0174258 A1 | 7/2007 | Jones et al. |
| 2007/0255702 A1 | 11/2007 | Orme |
| 2007/0271205 A1 | 11/2007 | Aravamudan et al. |
| 2008/0077570 A1 | 3/2008 | Tang et al. |
| 2008/0091656 A1 | 4/2008 | Charnock et al. |
| 2008/0091670 A1 | 4/2008 | Ismalon |
| 2008/0104032 A1 | 5/2008 | Sarkar |
| 2008/0126552 A1 | 5/2008 | Berger et al. |
| 2008/0154611 A1 | 6/2008 | Evermann et al. |
| 2008/0235202 A1 | 9/2008 | Wang et al. |
| 2008/0270110 A1 | 10/2008 | Yurick et al. |
| 2008/0270138 A1 | 10/2008 | Knight et al. |
| 2008/0270344 A1 | 10/2008 | Yurick et al. |
| 2009/0006343 A1 | 1/2009 | Platt et al. |
| 2009/0106224 A1 | 4/2009 | Roulland et al. |
| 2009/0150343 A1 | 6/2009 | English et al. |
| 2009/0198488 A1 | 8/2009 | Vigen |
| 2009/0222853 A1 | 9/2009 | White et al. |
| 2009/0281923 A1* | 11/2009 | Selinger ................ G06Q 30/02 705/26.1 |
| 2009/0282333 A1 | 11/2009 | Olsen et al. |
| 2010/0010989 A1 | 1/2010 | Li et al. |
| 2010/0057801 A1 | 3/2010 | Ramer et al. |
| 2010/0094854 A1 | 4/2010 | Rouhani-Kalleh |
| 2010/0138296 A1 | 6/2010 | Ramer et al. |
| 2010/0228540 A1 | 9/2010 | Bennett |
| 2010/0262456 A1 | 10/2010 | Feng et al. |
| 2010/0332305 A1 | 12/2010 | Higgins et al. |
| 2011/0015996 A1 | 1/2011 | Kassoway et al. |
| 2011/0066643 A1 | 3/2011 | Cooper et al. |
| 2011/0066644 A1 | 3/2011 | Cooper et al. |

(56) References Cited

U.S. PATENT DOCUMENTS

| | | |
|---|---|---|
| 2011/0066645 A1 | 3/2011 | Cooper et al. |
| 2011/0071819 A1 | 3/2011 | Miller et al. |
| 2011/0131043 A1 | 6/2011 | Adachi et al. |
| 2011/0179114 A1* | 7/2011 | Dilip ............... G06F 16/9535 709/204 |
| 2011/0209047 A1 | 8/2011 | Olsen et al. |
| 2011/0218808 A1 | 9/2011 | Parthasarathy |
| 2011/0224978 A1 | 9/2011 | Sawada |
| 2011/0225192 A1 | 9/2011 | Imig et al. |
| 2012/0016678 A1 | 1/2012 | Gruber et al. |
| 2012/0053942 A1 | 3/2012 | Minamino et al. |
| 2012/0109953 A1 | 5/2012 | Brown |
| 2012/0143965 A1 | 6/2012 | Parker et al. |
| 2012/0265787 A1 | 10/2012 | Hisu et al. |
| 2012/0310622 A1 | 12/2012 | Zivkovic et al. |
| 2013/0024211 A1 | 1/2013 | Monteforte et al. |
| 2013/0145385 A1 | 6/2013 | Aghajanyan et al. |
| 2013/0155068 A1* | 6/2013 | Bier .................. G06Q 10/10 345/440 |
| 2013/0158980 A1 | 6/2013 | Landry et al. |
| 2013/0179440 A1* | 7/2013 | Gordon ............. G06Q 10/06 707/E17.014 |
| 2013/0185368 A1 | 7/2013 | Nordstrom |
| 2013/0246430 A1 | 9/2013 | Szucs et al. |
| 2013/0262485 A1 | 10/2013 | Li et al. |
| 2013/0262501 A1 | 10/2013 | Kuchmann-Beauger et al. |
| 2013/0275429 A1 | 10/2013 | York |
| 2013/0297285 A1 | 11/2013 | Kwon |
| 2013/0332438 A1* | 12/2013 | Li ..................... G06F 16/24575 707/706 |
| 2014/0006951 A1* | 1/2014 | Hunter .............. H04N 21/8166 715/719 |
| 2014/0039879 A1 | 2/2014 | Berman |
| 2014/0040274 A1 | 2/2014 | Aravamudan |
| 2014/0074606 A1 | 3/2014 | Graham et al. |
| 2014/0163965 A1 | 6/2014 | Barve |
| 2014/0214401 A1 | 7/2014 | Li |
| 2014/0214840 A1 | 7/2014 | Gupta et al. |
| 2014/0006012 A1 | 8/2014 | Zhou |
| 2014/0025705 A1 | 8/2014 | Barve |
| 2014/0223481 A1* | 8/2014 | Fundament ....... H04N 21/4828 725/40 |
| 2014/0236572 A1 | 8/2014 | Meshulam et al. |
| 2014/0244263 A1 | 8/2014 | Pontual |
| 2014/0280289 A1 | 9/2014 | Marantz et al. |
| 2014/0280291 A1 | 9/2014 | Collins et al. |
| 2014/0297666 A1* | 10/2014 | Morris ............... G06F 16/2453 707/754 |
| 2014/0337370 A1 | 11/2014 | Aravamudan |
| 2014/0337381 A1 | 11/2014 | Aravamudan |
| 2015/0006290 A1 | 1/2015 | Tomkins et al. |
| 2015/0006564 A1 | 1/2015 | Tomkins et al. |
| 2015/0058117 A1 | 2/2015 | Yehaskel et al. |
| 2015/0081656 A1 | 3/2015 | Wang |
| 2015/0154643 A1 | 6/2015 | Artman et al. |
| 2015/0161673 A1 | 6/2015 | Guo et al. |
| 2015/0169701 A1* | 6/2015 | Stekkelpak ......... G06F 16/903 707/723 |
| 2015/0278961 A1 | 10/2015 | Ratti |
| 2015/0289120 A1 | 10/2015 | Harber |
| 2015/0312629 A1 | 10/2015 | Bugajski et al. |
| 2016/0080292 A1 | 3/2016 | Szeto |
| 2016/0162574 A1 | 6/2016 | Gorodilov |
| 2016/0179801 A1 | 6/2016 | Venkataraman |
| 2016/0189217 A1 | 6/2016 | Burgess et al. |
| 2016/0226984 A1 | 8/2016 | Christensen |
| 2016/0227283 A1 | 8/2016 | Christensen |
| 2016/0342702 A1 | 11/2016 | Barve |
| 2016/0351187 A1 | 12/2016 | Dandekar et al. |
| 2017/0004184 A1 | 1/2017 | Jain |
| 2017/0017719 A1 | 1/2017 | Aravamudan |
| 2017/0060855 A1 | 3/2017 | Song et al. |
| 2017/0140405 A1 | 5/2017 | Gottemukkala et al. |
| 2017/0262449 A1 | 9/2017 | Venkataraman et al. |
| 2017/0365254 A1 | 12/2017 | Aravamudan et al. |
| 2018/0052915 A1 | 2/2018 | Cohn et al. |
| 2018/0139298 A1 | 5/2018 | Kelly |
| 2018/0181661 A1 | 6/2018 | Jiron et al. |
| 2018/0225013 A1 | 8/2018 | Barrett |
| 2018/0226073 A1 | 8/2018 | Hodge et al. |
| 2018/0260445 A1 | 9/2018 | Aravamudan |
| 2018/0277113 A1 | 9/2018 | Hartung et al. |
| 2018/0308202 A1 | 10/2018 | Appu |
| 2018/0342174 A1 | 11/2018 | Zhang et al. |
| 2018/0349755 A1 | 12/2018 | Gao |
| 2018/0359477 A1 | 12/2018 | Yang |
| 2019/0051317 A1 | 2/2019 | Aravamudan |
| 2019/0108447 A1 | 4/2019 | Kounavis |
| 2019/0164553 A1 | 5/2019 | Leeb |
| 2019/0179861 A1 | 6/2019 | Goldenstein |
| 2019/0197357 A1 | 6/2019 | Anderson |
| 2019/0295211 A1 | 9/2019 | Appu |
| 2019/0318648 A1 | 10/2019 | Zhang et al. |
| 2019/0335007 A1 | 10/2019 | Kelly |
| 2020/0110578 A1 | 4/2020 | Miller et al. |
| 2020/0279019 A1 | 9/2020 | Peterson et al. |
| 2020/0302110 A1 | 9/2020 | Agostino et al. |
| 2020/0327197 A1 | 10/2020 | Bhowal et al. |
| 2020/0351361 A1 | 11/2020 | Kelly |
| 2020/0365148 A1 | 11/2020 | Ji et al. |
| 2020/0372117 A1 | 11/2020 | Han et al. |
| 2021/0157813 A1 | 5/2021 | Hammad et al. |
| 2021/0201932 A1 | 7/2021 | Aravamudan et al. |
| 2021/0314413 A1 | 10/2021 | Kelly et al. |
| 2021/0319048 A1 | 10/2021 | Aravamudan et al. |
| 2022/0058347 A1 | 2/2022 | Singaraju et al. |
| 2022/0222211 A1 | 7/2022 | Lynch et al. |
| 2023/0019782 A1 | 1/2023 | Barve et al. |
| 2023/0026181 A1 | 1/2023 | Venkataraman et al. |
| 2023/0125513 A1 | 4/2023 | Kelly et al. |
| 2023/0135944 A1 | 5/2023 | Kelly et al. |
| 2023/0138953 A1 | 5/2023 | Kelly et al. |
| 2023/0205798 A1 | 6/2023 | Aravamudan et al. |
| 2023/0206940 A1 | 6/2023 | Aravamudan et al. |

FOREIGN PATENT DOCUMENTS

| | | |
|---|---|---|
| JP | H09146972 | 6/1997 |
| JP | 2001034292 | 2/2001 |
| JP | 2001043246 | 2/2001 |
| JP | 2001100787 | 4/2001 |
| JP | 2001175680 | 6/2001 |
| JP | 2002108915 | 4/2002 |
| JP | 2003058538 | 2/2003 |
| JP | 2006107469 | 4/2006 |
| JP | 2007511016 | 4/2007 |
| JP | 2008-243047 | 10/2008 |
| JP | 2009037603 | 2/2009 |
| JP | 2009163688 A | 7/2009 |
| JP | 2010205265 | 9/2010 |
| KR | 101322821 | 10/2013 |
| WO | WO1998013771 | 4/1998 |
| WO | WO2002073331 | 9/2002 |
| WO | 2007089967 A2 | 8/2007 |
| WO | WO2007103938 | 9/2007 |
| WO | WO2011088053 | 7/2011 |
| WO | 2012088590 A1 | 7/2012 |
| WO | 2016123188 A1 | 8/2016 |

OTHER PUBLICATIONS

Brazilian Patent Application BR 1120 15001363-5, filed Jul. 19, 2013, Preliminary Office Action dated Aug. 4, 2020.

Kumar et al., "Reference resolution as a facilitating process towards robust multimodal dialogue management: A cognitive grammar approach," International Symposium on Reference Resolution and its Application to Question Answering and Summarization, Jan. 1, 2003 (8 pages).

PCT International Search Report for International Application No. for PCT/US2014/037501, dated Sep. 3, 2014 (7 pages).

Anonymous, "Speech recognition", Anonymous: "Speech recognition—Wikipedia", Jan. 31, 2012, (Jan. 31, 2012), XP055700274, Retrieved

(56) References Cited

OTHER PUBLICATIONS from the Internet: URL:https://en.wikipedia.org/w/index.php?title=Speech recognition&oldid=4741 61019 [retrieved on Jun. 2, 2020].

Denis Alexandre, et al., "Resolution of Referents Grouping in Practical Dialogues" 7th Sigdial Workshop on Discourse and Dialogue Jan. 1, 2006, Sydney, Australia.

Denis et al., "Resolution of Referents Groupings in Practical Dialogues", 7th Sigdial Workshop on Discourse and Dialogue—SIGDIAL'06, Jan. 1, 2006, Sydney, Australia DOI: 10.3115/1654595.1654608 (7 pages).

Jurafsky et al., "Chapter 21: Computational Discourse" In: "Computational Linguistics (Online)", MIT Press, Cambridge, MA, USA (2007) (47 pages).

Venkataraman et al., "A Natural Language Interface for Search and Recommendations of Digital Entertainment Media", IBC 2015 Conference, pp. 1-11, XP055274592 (2015) (11 pages).

Ninomiya et al., "A Diagramming tool of the conversation for communication support," The Institute of Electronics Information and Communication Engineers, Technical Report of IEICA, IN2004-168, TM2004-91.OIS2004-89 (Jan. 2005) (7 pages).

U.S. Appl. No. 17/354,295, filed Jun. 22, 2021, Timothy Christensen Kelly.

U.S. Appl. No. 18/087,041, filed Dec. 22, 2022, Timothy Christensen Kelly.

U.S. Appl. No. 17/202,496, filed Mar. 16, 2021, Murali Aravamudan.

U.S. Appl. No. 17/858,550, filed Jul. 6, 2022, Sashikumar Venkataraman.

U.S. Appl. No. 17/873,912, filed Jul. 26, 2022, Rakesh Barve.

U.S. Appl. No. 18/115,466, filed Feb. 28, 2023, Murali Aravamudan.

U.S. Appl. No. 18/115,612, filed Feb. 28, 2023, Murali Aravamudan.

\* cited by examiner

Common Cast / Crew Between Two Titles

To find a list of people who worked together on two titles, start typing the first title and select it from the drop-down. Then, advance to the second box and follow the same steps. Once you have your two titles selected, click the search button to continue.

[Search]

Two People Working Together

To begin, start typing one person's name in the first box and select the name from the drop-down list of possible matches. Then, advance to the second box and follow the same steps. Once you have your two names selected, click the search button to continue.

[Search]

FIG. 3

METHOD AND SYSTEM FOR CAPTURING AND EXPLOITING USER INTENT IN A CONVERSATIONAL INTERACTION BASED INFORMATION RETRIEVAL SYSTEM

CROSS-REFERENCE TO RELATED APPLICATIONS

This application is a continuation of U.S. patent application Ser. No. 15/913,609, filed Mar. 6, 2018, which is a continuation of U.S. patent application Ser. No. 14/274,147, filed May 9, 2014, now U.S. Pat. No. 9,946,757, issued Apr. 17, 2018, which claims the benefit under 35 U.S.C. § 119(e) to U.S. Provisional Patent Application No. 61/822,098, filed May 10, 2013, the entire contents of which are incorporated by reference herein in their entireties.

This application is related to the following applications:
U.S. patent application Ser. No. 13/667,400, entitled Method of and System for Inferring User Intent in Search Input in a Conversational Interaction System, filed Nov. 2, 2012;
U.S. patent application Ser. No. 13/801,958, entitled Method for Adaptive Conversation State Management with Filtering Operators Applied Dynamically as Part of a Conversational Interface, filed Mar. 13, 2013.

The entire contents of all applications described above are incorporated by reference herein.

BACKGROUND

Field of Invention

The invention relates to conversational interaction techniques and, more specifically, to capturing and exploiting user intent in a conversational interaction.

Description of Related Art and Context

A conversational interaction system for information retrieval engages in a dialogue session with a user, using text or speech input from the user. The system determines a user intent to generate a response, which can be final or intermediate. A final response delivers results that the user intended, and an intermediate response (or an intermediate question) tries to clarify and disambiguate the user intent by requesting additional information from the user.

One interaction session can include multiple query-response exchanges between a user and the conversational interaction system. In each exchange, the user makes a query, and the system returns with a response. The user may provide a related or independent query which starts the next query-response exchange.

Typically, an information retrieval system delivers a response based on the last input. As set forth in more detail below, implementations of the invention improve upon this style of interaction by extracting information from earlier exchanges to better understand the context and scope of the conversation (or a conversation state).

SUMMARY

The present disclosure includes methods and systems for capturing and exploiting user intent in an instant and impulsive conversational interaction based information retrieval system.

Embodiments include a computer-implemented method of processing a search request received from a user. The search request is directed at identifying a desired item from a set of items. The method includes providing access to a set of content items. The content items are associated with metadata that describes corresponding content items. The method includes providing information about at least one search previously performed for a user, and providing access to information describing relationships between at least one of the content items and the metadata describing the content items. The method also includes receiving a present input from the user. The present input is intended by the user to identify a desired content item. Upon a determination that results from the at least one previous search did not satisfy the search request from the user, the method includes determining an intent shared by the previous search and the present input based on comparing (i) the information describing the relationships, (ii) the previous search, and (iii) the present input. The method includes selecting a subset of content items based on comparing the shared intent and the metadata that describes the content items, and presenting the subset of content items.

Embodiments include systems for processing a search request received from a user. The search request is directed at identifying a desired item from a set of items. The system includes computer readable instructions encoded on a non-transitory computer readable medium. The computer readable instructions cause the computer system to provide access to a set of content items. The content items are associated with metadata that describes corresponding content items. The computer readable instructions cause the computer system to provide information about at least one search previously performed for a user, and provide access to information describing relationships between at least one of the content items and the metadata describing the content items. The computer readable instructions cause the computer system to receive a present input from the user. The present input is intended by the user to identify a desired content item. Upon a determination that results from the at least one previous search did not satisfy the search request from the user, the computer readable instructions cause the computer system to determine an intent shared by the previous search and the present input based on comparing (i) the information describing the relationships, (ii) the previous search, and (iii) the present input. The computer readable instructions cause the computer system to select a subset of content items based on comparing the shared intent and the metadata that describes the content items, and present the subset of content items.

The embodiments described herein can include additional aspects. For example, the determination that the results from the at least one previous search did not satisfy the search request from the user may be based on metadata associated with (a) the at least one previous search, (b) the search results from the at least one previous search, and/or (c) the present input. The determining the intent shared by the previous search and the present input can include identifying a previous smart tag, a previous category, and/or a previous microcategory associated with the previous search; identifying a present smart tag, a present category, and/or a present microcategory associated with the present input; and determining the intent based on determining at least one relationship between (a) the previous smart tag and the present smart tag, (b) the previous category and the present category, and/or (c) the previous microcategory and the present microcategory. The determining the at least one relationship may be based on determining a measure of relatedness based on a collection of relationship distances of entities. The entities may include (a) a content item, (b) an element of the at least one previous search, and/or (c) an element of the present input, and the relatedness measure may be based on one of the relationship distances. The collection of relationship distances of entities may include a relationship graph with nodes and edges. The nodes may represent the entities, and the edges may represent a direct relationship between any two entities. The relatedness measure of two entities may be measured in a number of hops between two nodes corresponding to the two entities. Each edge may have a weight, where the relationship distance of two entities is a combination of weights of edges connecting two nodes corresponding to the two entities. The relationship distances may be modified by user preferences acquired over time. The determining the at least one relationship may be based further on a collection of historical inputs, where the relationship distances of the entities are determined based on how often the entities were used together according to the historical inputs. The determining the at least one relationship may be based further on user preferences acquired over time, and the relatedness measure may be modified based on the user preferences. The comparing (i) the information describing the relationships, (ii) the previous search, and (iii) the present input may be based on identifying elements of the previous search and/or the present input by applying a predefined rule, and based further on identifying relationships between the identified elements. The predefined rule may use a Bayes classifier.

Any of the aspects or embodiments set forth above can be combined with any of the other aspects or embodiments set forth herein.

BRIEF DESCRIPTION OF THE DRAWINGS

For a more complete understanding of various embodiments of the present systems and methods, reference is now made to the following descriptions taken in connection with the accompanying drawings in which like reference numbers refer to like elements:

FIG. 3 illustrates other filters of the example interface of FIG. 2, in accordance with some embodiments.

DETAILED DESCRIPTION

Figure 1:
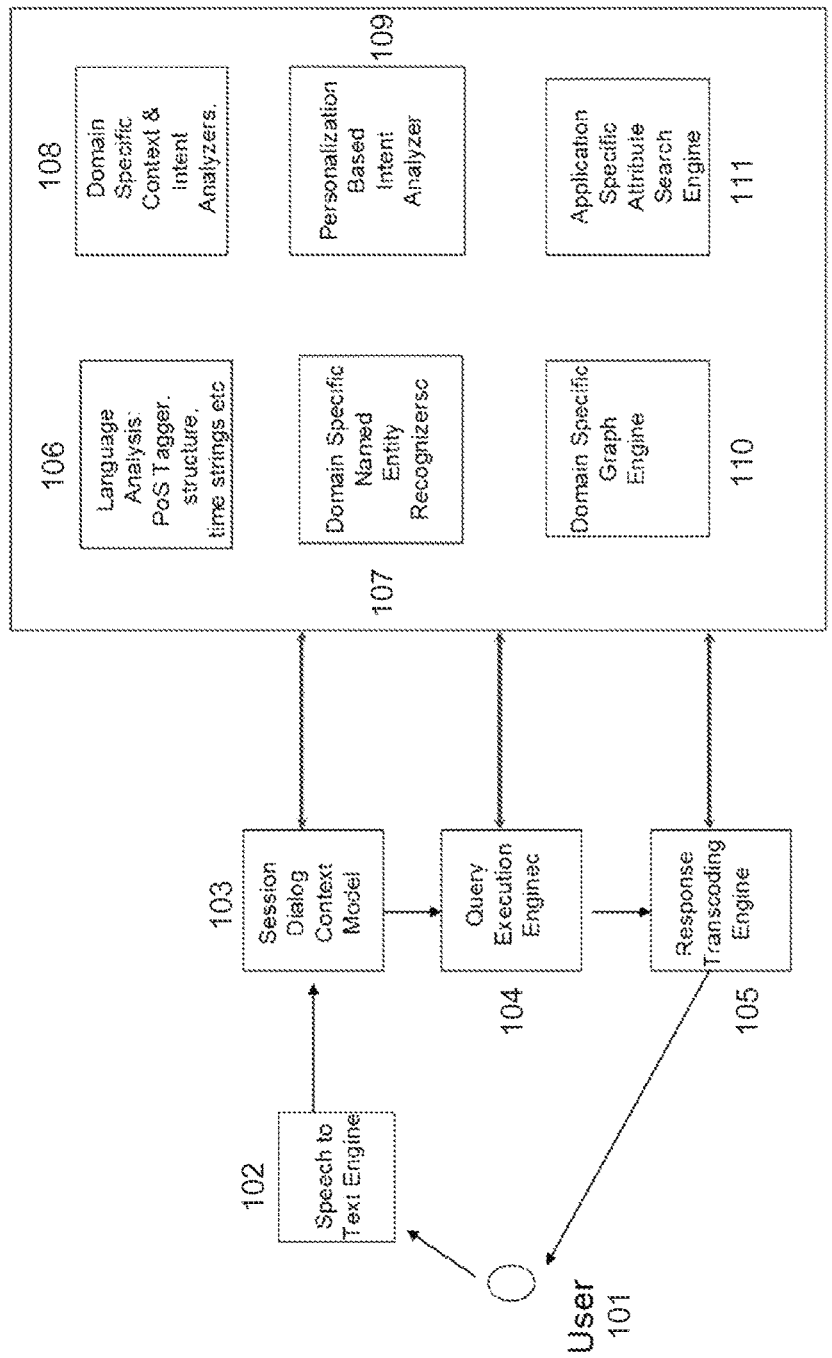
FIG. 1 illustrates an example overall system architecture for information retrieval using speech input, in accordance with some embodiments.

A method and system for capturing and exploiting user intent in an instant and impulsive conversational interaction based information retrieval system is provided. As used herein, "instant" or "impulsive" intent is meant to capture the concept of an over-arching or higher-order intent of the user, as explained in more detail below. The higher-order intent is sometimes referred to herein as a "shared intent."

The system semantically analyzes a list of queries and responses between the system and a user in real-time and determines a higher-order real-time intent—that is, an intent of user input in a series of conversations or conversational interactions. Using a higher-order real-time intent (analyzed from multiple query-response exchanges), the system generates a response that is more natural. In some embodiments, a conversational interaction system for information retrieval uses a higher-order real-time intent to determine closely related real-time user intents and to provide advertisements, applications, products, and services related to the higher-order and/or closely related real-time user intents. As used herein, a closely related real-time user intent represents an alternate user intent the system has determined might still satisfy the user when the original intent cannot be satisfied.

Real-time Conversation Intent

People tend to continue their conversation on a topic, rather than frequently jumping from one topic to another and confusing the other party. Similarly, when they are engaged in questions and answers, the topic of their conversation typically remains the same. In some embodiments of the present disclosure, the present system gathers information from a series of queries and responses in a single session. The present system uses the context of the queries and responses to better understand the user's shared intent and presents responses satisfying the shared intent.

To use the previous exchanges of information in the present response, the system analyzes how previous queries and responses relate to the current query and response. Exemplary methods to relate previous exchanges with new input can use smart tags, categories, and/or microcategories.

Universal Smart Tagging System

In some embodiments, the present system matches items in a universal smart tagging system with entities in the current (i.e., last, or most recently submitted) query—that is, the query to which the system needs to respond. The universal smart tagging system can help relate the current query with previous queries and relate current entities with other entities. The universal smart tagging system can include one or more databases for the storage and retrieval of information. The actual arrangement and structure of the databases described herein is not intended in a limiting sense, but is merely illustrative. The universal smart tagging system can include a database of named entities, each of which is associated with a globally unique identifier (GUID). The named entities can include known entities, topics, and/or content items or collections with which metacontent is associated. For example, the named entities can include famous or popular personalities (e.g., actors, sports heroes, politicians, and/or musicians), musical groups, sports teams, sports tournaments or leagues, movies, television shows, scientific topics, and/or political topics. The foregoing list is illustrative only, as other types of entities are within the scope of the invention. As described in more detail below, one advantage of the use of the name entities is to permit an "accepted identifier" to be established for the entity.

The database of named entities can be formed from sources of information that are known to be (or have been designated) reliable sources of information for a particular topic. For example, ESPN websites and databases can provide named entities, and associated information, for sports-related topics; the IMDb website and databases can provide named entities, and associated information, for movie-related topics; and the Gracenote® databases can provide named entities, and associated information, for digital entertainment (e.g., music). The sources are merely illustrative, as other information sources, both public and private (e.g., amazon.com, Wikipedia, and Last.FM), can provide sources of information to use for named entities and associated information. Moreover, the database of named entities can be constantly updated and improved in the sense that metacontent and popularity estimates for existing named entities may be modified to reflect the present status of the entities. Moreover, new named entities can be added to the database as they are discovered. For example, as a new movie is advertised, the new movie can be added as a named entity to the database in the universal smart tagging system.

Metacontent that describes or is otherwise associated with the named entities can then be associated with the named entities in the universal smart tagging system. The metacontent that becomes associated with the named entities can depend on the named entity itself. For example, if a particular named entity is a movie, then the genre of the movie, character names, actor names, cities in which the movie takes place, famous quotes, other keywords, etc., are associated with the named entity. In contrast, if the named entity is an athlete, then the sport played, the athlete's team, awards received, etc., can be associated with the named entity.

U.S. patent application Ser. No. 12/879,141, entitled Method of and System for Presenting Enriched Video Viewing Analytics, filed on Sep. 10, 2010, which is incorporated by reference herein in its entirety, provides techniques for populating and using smart tags.

As mentioned above, the arrangement and structure of the database characterizing content items or the catalog of information associated with the content items is not limiting. The information can be in the form of a node graph, as described herein, or the information can be arranged in a hierarchical manner. Further still, the information used to infer higher-order intent can be a "flat" collection of metacontent that is associated with the content items, and the relationships between the items determined in real-time based on the information. Regardless, the embodiments described herein use the information and the relationships between elements of the information and the content the information describes to infer shared aspects or commonalities in the search input provided by the user as well as the search results returned by the system.

Categories and Microcategories

In some embodiments, the present system matches categories and/or microcategories to relate entities from the current query to other entities. As used herein, the term "category" refers to an overall theme of an item. The collection of categories is system-definable, and can be as broad or as refined/detailed as necessary. In addition, the categories can be defined independent of the retrievable items and can be defined ahead of populating a content system with retrievable items. In one implementation, a function g(x) returns a subset of the set of categories for a given item. Thus, g(x) is a function with a domain space of a set of retrievable items and the range space of a set of all subsets of categories. This implementation thereby allows any retrievable item to belong to more than one category, e.g., a movie Sleepless in Seattle has a category of movie and romance.

As used herein, the term "microcategory" refers to a very refined, unambiguous theme of descriptor for a given item. For example, "New England Patriots" as a search item has a microcategory of "NFL Football" and categories of "football" and "sports." As with categories, a search item can have multiple microcategories. While categories are "macro" themes, microcategories are "micro", unambiguous themes; these themes come from descriptive terms and metadata within the search items. Thus, example microcategories for "New England Patriots" also include "Tom Brady." Microcategories are not limited to a set of predetermined descriptors, as are categories in the prior art, but can be any word that describes the item. Whether a particular theme is a category or microcategory depends on the particular item with which the theme is associated and the configuration of the content system. Thus, in some embodiments microcategories are dynamic and generated "on-the-fly", while categories are static and system defined.

In dataspaces other than the television content space, the channel, category, and microcategory approach to characterizing items is modified to reflect the attributes of the content items in that particular dataspace. Thus, for a telephone directory dataspace, the channel statistics are replaced with statistics related to the person or entity called. The category statistics are replaced by statistics related to the type of entity called, for example, individual or business. Microcategory statistics are replaced by statistics related to key secondary attributes of the item, such as home, office, and mobile telephone numbers, as well as, for example, telephone numbers of persons related to the persons called.

U.S. Pat. No. 8,438,160, entitled Methods and Systems for Selecting and Presenting Content Based on Dynamically Identifying Microgenres Associated with the Content, issued May 7, 2013, which is incorporated by reference herein in its entirety, provides techniques for creating categories (genres) and microcategories (microgenres).

Determining Higher-Order Real-Time Intent

To determine a higher-order real-time intent, the present system compares entities in a series of query inputs/system responses and determines a trend or shared input common to the entities. In some embodiments, the trend is determined based on metadata or categories/microcategories that are repeatedly associated with provided entities. For example, if a user provides entities, such as "Red Sox," "Patriots," and "Bruins" in speech input, the present system checks the universal smart tagging system or other databases for relationships between the entities. When the present system recognizes that all three entities are related to sports, sports teams, or New England sports teams, the present system can determine that the trend can be either "sports," "sports teams," or "New England sports teams."

Some embodiments determine one main trend or shared intent between multiple trends. For example, the present system looks to the most granular level of detail in common. In the previous sports example, since New England sports teams have the narrowest scope while including all of the entities, the system selects New England sports teams as the main trend.

Alternatively, the present system can use multiple trends in response to queries. The present system can perform a search based on all or part of the trends and present the results. These search results can be ranked based on personal preferences or general popularities.

Also, the present system can use a weighted relationship between the entities when the relationship between entities is weighted. For example, entities "Boston" and "Red Sox," "New England" and "Patriots," and "Boston" and "Bruins" are used together frequently, so these entities may have high weights. When the three teams are used together, the present system recognizes the trend (New England sports teams) based on the assigned weights in entity relationships.

In some embodiments, the present system also determines when to start a new query-response session, rather than relating the previous exchanges with the current query. For example, the present system uses a conversation state space a described below. If a new entry is completely remote from the current conversation state space, the conversation state space can be reset and a new query-response session can begin.

The following examples illustrate detection of a real-time conversation intent and presenting a response to the user using the present conversational interaction system for informational retrieval technology. The non-limiting examples are selected from the field of entertainment, such as movies, TV shows, sports, news. However, the present method and system for information retrieval can apply in general to any field.

In this example, a user provides consecutive sports-related queries.

User: Is there an NHL game tonight?
System: No, there is no NHL game tonight.
User: When is the next game?
System: The next NHL game is on September 21.
User: What about an NBA game?
System: There is no NBA game tonight. So you want to catch up with some games, right?
User: Yes, what else is there?
System: There is an NCAA basketball game at 6 PM tonight.

The present system recognizes that the trend or shared intent in this conversation session is "sports event tonight," based on previous search inputs of the user, along with relationship information among the items identified in the previous and present search inputs. When the user asks "what about an NBA game?," the present system determines that the previous search results for National Hockey League (NHL) games did not satisfy the previous search from the user. In some embodiments, the determination that the previous search results did not satisfy the user is based on metadata associated with the previous search results. For example, the present system determines that metadata such as a future television air time for the search result, is too far in the future. The present system selects a subset of content items relating to NBA games, as requested by the user. The present system further determines the NBA subset of content items is also unlikely to satisfy the user's search request, perhaps also based on a future television air time of the NBA games. The present system determines the shared intent between the previous NHL search query and the present NBA search query (e.g., sports games), and asks "So you want to catch up with some games, right?" When the user asks "Yes, what else is there?," the present system presents another sports game to the user based on the shared intent. The present system can provide a long list of sports games and can, optionally, rank the items based on user preference information.

However, not all prior queries may be related to the current intent. The user can enter a non-related query in the middle of the conversation, and the present system can keep track of the trend. For example, the user may ask about the weather or time in the middle of a series of sports-related queries. When the user returns to asking about sports, the system can maintain the trend of sports.

Some example trends or shared intents can be more specific. If a user asks in a series of queries about "NBA game scores in the past two weeks," the present system determines that the trend is the NBA game scores in the past two weeks. In this case, the user may be catching up with the NBA games that he or she has not been following for the past two weeks. The trend can also be broader. For example, the shared intent can simply be "sports."

In another example, there are three query-responses about various New England teams across multiple sports.

User: Can you record a Bruins game tonight?
System: There is no Bruins game tonight.
User: What about the Pats?
System: The Pats will play Devils at 7 pm. Should I record the game?
User: Yes. Celtics?
System: The Celtics will play Knicks at 7:30 pm. I will record both games.

The user asks about the "Boston Bruins," "New England Patriots," and "Boston Celtics." These three entities have a common theme or shared intent: "Boston/New England sports teams." The present system determines that the previous search results did not satisfy the user's search. For example, the present system determines based on entity recognition that the user's search relates to sports games being shown "tonight" on television. The Bruins subset of content items may be empty with metadata relating to games being shown "tonight." Upon the determination that the previous search results did not satisfy the user's search, and using the shared intent, the present system recognizes the specific intent of the user is recording these broader sports games, and offers to record the games determined to be related to the shared intent.

There can be multiple query-responses about various categories.

User: Are there any romantic comedies on TV on Saturday evening?
System: Yes, there is Silver Linings Playbook.
User: What about Major League Baseball games on Sunday evening?
System: No, there isn't any MLB game.
User: Is there a documentary on Saturday evening?
System: Yes, there is one about John F. Kennedy.
User: What else is there?
System: Hmmm, looks like you're planning to watch TV this weekend
System provides a list of TV shows on Saturday or Sunday evening.

The user asks about romantic comedies on TV on Saturday evening, MLB games on Sunday evening, and documentaries on Saturday evening. The present system recognizes that the higher-order intent and/or closely related real-time intent is watching TV. The present system further recognizes the search results did not satisfy the user based on an absence of directly overlapping metadata such as microcategories, categories, or smart tags. For example, the present system recognizes there is no thematic trend in what shows the user requests to watch. The system can recognize that the user is looking for TV shows to watch either on Saturday evening or Sunday evening. If the present system recognizes the pattern "weekend evening," the present system can detect the user intent being TV shows to watch on weekend evenings and provide TV shows in weekend evenings. On the other hand, if the present system is not pre-programmed with the pattern "weekend evening," but with "evening," the present system can provide a list of evening TV shows. In further embodiments, the present system sends back a human-like response (such as "Hmmm, looks like you're planning to watch TV this weekend") or any other curated response.

In some embodiments, the present system learns temporal patterns dynamically and adds the temporal patterns to the system as the system exchanges information with the users, in a way similar to how microcategories can be added to the system. For instance, a person working from Friday to Tuesday and resting on Wednesday and Thursday may provide queries about shows to watch on Wednesdays and Thursdays. After several exchanges of queries and responses, the present system recognizes this new "Wednesday-Thursday" pattern and uses it for future information retrieval. This new pattern can be used for information retrieval either only in the current session or in any future sessions. This new pattern can be a consecutive two days or any other combinations. A pattern of Tuesday, Thursday, and Saturday might be useful for a person who has busy schedules on Monday, Wednesday, Friday, and Sunday.

A user, for example, asks multiple queries about Oscar winning films.

User: Which movie won the Oscar's Best Picture in 2012?
  System: Argo.
  User: What about the Best Actor?
  System: Daniel Day-Lewis in Lincoln
  User: What about in 2011?
  System: Colin Firth of The King's Speech won the Best Actor, and The King's Speech won the Best Picture.
  User: Show me the list.
  System provides a list of Oscar winning films in various categories in 2011 and 2012.

The user provides inputs related to multiple categories ("best picture" and "best actor") of Oscar winning films over the last two years. The present system determines that the previous search results did not satisfy the user. In some embodiments, the determination that the previous search results did not satisfy the user is based on the user's search request. For example, the user's present search request is to "show me the list." The user's present search request implies she is looking for a broader list of content items, because otherwise the user would not request to "show me the list" of the same search results that were just provided. Therefore, the present system detects the current trend or shared intent, for example based on the identified categories, and provides a list of Oscar winning films in the past two years using this trend. In further embodiments, the present system provides only targeted categories while filtering out other categories, based on the user preference. For example, if the user has previously searched "Best Director," "Best Actor," "Best Cinematography" and "Best Picture," the present system may only return these categories or present content items corresponding to these categories at the top of the list. Alternatively, the present system may provide a list of Best Pictures and Best Actors in history.

In this example, a user asks about movies with a particular director.

User: What is the Rotten Tomatoes rating on "Rear Window"?
  System: 8.7
  User: What year did "Birds" get released?
  System: 1963
  User: Who were the main actors in "North by Northwest"?
  System: The movie starred Cary Grant, Eva Marie Saint, and James Mason.
  User: Can I watch one of these movies on TV?
  System: No, but you can watch Psycho.

The user asks about movies directed by Alfred Hitchcock. Even though the user never mentioned director Alfred Hitchcock, the present system detects a trend or shared intent—e.g., movies by Hitchcock. When the user asks the present system whether she can watch these movies, the present system may first look for the three movies mentioned by the user. The present system determines that these search results would not satisfy the user. For example, if the system finds that these movies are unavailable to watch on TV, the present system may provide a different movie by Hitchcock that is available, based on detecting movies by Hitchcock as the higher-order trend.

In some embodiments, the present shared intent triggers pre-configured and/or dynamic actions, in addition to generating a more human-like response. For example, the present system promotes meaningful applications, services, products, advertisements, or deals etc. Examples of such actions include providing coupons for movies, showing commercials about recently released movies similar to what the user intends to watch, and presenting an app that the user can use to watch a movie.

Conversational System Architecture

The present conversational information retrieval system capturing and exploiting user intent can have the conversational system architecture described below.

FIG. 1 illustrates an example overall system architecture for information retrieval using speech input, in accordance with some embodiments. Embodiments of the invention described herein can, optionally, work in conjunction with the techniques and systems set forth in U.S. patent application Ser. No. 13/667,388, entitled Method of and Systems for Using Conversation State Information in a Conversational Interaction System, filed Nov. 2, 2012 and U.S. patent application Ser. No. 13/667,400, entitled Method of and Systems for Inferring User Intent in Search Input in a Conversational Interaction System, filed Nov. 2, 2012, each of which is incorporated by reference herein. User 101 speaks his/her question that is fed to a speech to text engine 102. The speech to text engine outputs recognized words and pauses in a canonical format (e.g., in the form of a parse tree, using techniques known in the art). The text form of the user input is fed to session dialog content module 103. This module plays the role of maintaining state across conversation, a key use of which is to help in understanding user intent during a conversation, as described below.

The session dialog, in conjunction with a language analyzer (or part of speech tagger) 106 and the other entity recognizer modules described below, breaks down the sentence into its constituent parts that can be broadly categorized as (1) intents—the actual intent of the user, such as find a movie, play a song, tune to a channel, respond to an email, etc. (2) entities—noun or pronoun phrases describing the intent and (3) filters—qualifiers to entities such the "latest" movie, "less" violence, etc. Filters can operate on both intents and entities. In some embodiments, the conversation state is composed of entities and intents with the application of filters on them.

In the context of the goal of providing an intelligent and meaningful conversation, the present system leverages intent along with the entities and filters described among all three categories. Any traditional good search engine can perform an information retrieval task fairly well just by extracting the entities from a sentence—without understanding the grammar or the intent. Consider the user question, "Can my daughter watch Pulp Fiction with me"—most search engines would show a link for Pulp Fiction, which may suffice to find a rating that may or may not be available from traversing that link. But in the present conversational interface, the expectation is clearly higher—the present system understands the (movie, rating) shared intent corresponding to the expected response of the rating of the movie and the age group that the movie is appropriate for. A conversational interface response degenerating to a response that a traditional search engine might provide is similar to a failure of the system from a user perspective. The present system uses intent determination along with responses to the user's questions that appear closer to a human's response when intent is not known or clearly discernible, thereby providing a conversational interface able to be closer to human interaction than to a search engine. Intent analyzer 108 is a domain-specific module that analyzes and classifies intent for a domain and works in conjunction with other modules—domain-specific entity recognizer 107, personalization based intent analyzer 109 that classifies intent based on user's personal preferences, and domain-specific graph engine 110.

Entity recognizer 107 recognizes entities in user input. Entity recognition may optionally involve error correction or compensation for errors in user input, described in more detail below. In some embodiments, the classifying of a subset of user input as an entity is a weighting. There could be scenarios in which an input could be scored as both an entity and as an attribute during the analysis and resolution of the input into component parts. These ambiguities are resolved in many cases as the sentence semantics become clearer with subsequent processing of the user input. In some embodiments, one component used for resolution is the entity relationship graph, described in more detail below. Output of the entity recognizer is a probability score for subsets of input to be entities.

The intent analyzer, in some embodiments, is a rules driven intent recognizer and/or a naïve Bayes classifier with supervised training. It takes as input a parse tree, entity recognizer output, and attribute specific search engine output (discussed below). In some implementations, user input may go through multiple entity recognition, the attribute recognition, and intent recognition steps, until the input is fully resolved. The intent recognizer deciphers the intent of a sentence, and also deciphers the differences in nuances of intent. For instance, given "I would like to see the movie Top Gun" versus "I would like to see a movie like Top Gun", the parse trees would be different. This difference assists the intent recognizer to differentiate the meaning of "like." Rules based recognition, as the very name implies, recognizes sentences based on predefined rules. In some embodiments, predefined rules are specific to a domain space, for example, entertainment. In further embodiments, however, the naïve Bayes classifier component, just requires a training data set to recognize intent.

In embodiments that use entity relationship graphs (or equivalent data structures), the result information is incorporated into the graph along with the information that the techniques use to find the desired results. Thus, the output from the iterations of intent analyzer 108, entity recognizer 107, and attribute specific search engine 111 can be the results the user is seeking. In cases where the results are not found or the discovered results lack sufficient confidence, the present system may use intermediate nodes and/or entities to form clarifying questions to be passed to the user.

Attribute specific search engine 111 assists in recognizing filters and they influence the weights and properties of the entities and intents they qualify. While FIG. 1 is a conversation architecture showing the modules for a specific domain, some embodiments include a conversational interface in which the shared intent spans domains. In some embodiments, this multi-domain architecture uses multiple instances of the domain specific architecture shown in FIG. 1, and scores intent weights across domains to determine user intent based on how well a user input matches to a particular domain. Upon arriving at the results, some embodiments use portions of the results, in addition to user-entered information such as conversational queries, to create and preserve the conversation state space.

Information Repositories

In some embodiments, the present methods and systems use information repositories during information retrieval. Information repositories are associated with domains, which are groupings of similar types of information and/or certain types of content items. Certain types of information repositories include entities and relationships between the entities. Each entity and/or relationship has a type, respectively, from a set of types. Furthermore, associated with each entity and/or relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity has relationships with other entities, and these "other entities" serve as metadata to the "particular entity." In addition, each entity in the mapping can have attributes assigned to it or to the relationships that connect the entity to other entities in the mapping. Collectively, this makes up the metadata associated with the entities/content items. In general, such information repositories are called structured information repositories. Examples of information repositories associated with domains follow below.

A media entertainment domain includes entities such as movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities such as emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities such as cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. can be attribute fields.

An electronic commerce domain includes entities, such as, product items, product categories and subcategories, brands, stores, etc. Relationships between such entities can include compatibility information between product items, a product "sold by" a store, etc. Attribute fields include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Some embodiments also use unstructured repositories, i.e., repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, Internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories

The following description illustrates examples of information retrieval tasks in the context of structured and unstructured information repositories as described above.

In some cases, a user is interested in one or more entities of some type—generally called "intent type" herein—which the user wishes to uncover by specifying only attribute field constraints that the entities must satisfy. Note that sometimes intent may be a (type, attribute) pair when the user wants some attribute of an entity of a certain type. For example, if the user wants the rating of a movie, the intent could be viewed as (type, attribute)=(movie, rating). Such query-constraints are generally called "attribute-only constraints" herein.

Whenever the user names the entity or specifies enough information to directly match attributes of the desired intent type entity, it is an attribute-only constraint. For example, the user identifies a movie by name and some additional attribute (e.g., "Cape Fear" made in the 60s), or he specifies a subject match for the email he wants to uncover, or he asks for hotels based on a price range, or he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well-defined way. Such query-constraints are generally called connection-oriented constraints herein.

An example of a connection-oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set (intent type) made by Samsung that is also compatible with a Nintendo Wii. All of these are instances of connection-oriented constraints queries.

In the above connection-oriented constraint examples, the user explicitly describes or specifies the other entities connected to the intent entities. Such constraints are generally called explicit connection-oriented constraints and such entities as explicit entities herein.

Meanwhile, other queries contain connection-oriented constraints that include unspecified or implicit entities as part of the constraint specification. In such a situation, the user is attempting to identify a piece of information, entity, attribute, etc. that is not known through relationships between the unknown item and items the user does now. Such constraints are generally called implicit connection-oriented constraints herein and the unspecified entities are generally called implicit entities of the constraint herein.

For example, the user may wish to identify a movie she is seeking via naming two characters in the movie. However, the user does not recall the name of one of the characters, but she does recall that a particular actor played the character. Thus, in her query, she states one character by name and identifies the unknown character by stating that the character was played by the particular actor.

However consider the following user constraints for specific information retrieval goals: The user wants the role (intent) played by a specified actor (e.g., "Michelle Pfeiffer") in an unspecified movie that is about a specified role (e.g., the character "Tony Montana.") In this case the user's constraint includes an unspecified or implicit entity which corresponds to the movie "Scarface." Similarly, suppose that the user wants the movie (intent) starring the specified actor "Scarlett Johannsen" and the unspecified actor who played the specified role of "Obe Wan Kanobi" in a specified film "Star Wars." In this case the implicit entity is the actor "Ewan McGregor" and the intent entity is the movie "The Island" starring "Scarlett Johannsen" and "Ewan McGregor."

In the context of email repository, an example includes a user wanting to get the last email (intent) from an unspecified gentleman from a specified company "Intel" to whom he was introduced via email (an attribute specifier) last week. In this case, the implicit entity is a contact who can be discovered by examining contacts from "Intel", via an employee/company relationship, who was a first time common-email-recipient with the user last week.

The above three examples are connection oriented constraints but they include unspecified or implicit entities as part of the constraint specification—the present disclosure refers to such constraints as implicit connection-oriented constraints and the unspecified entities as implicit entities of the constraint.

Relationship and Entity Relationship Graph

Relationship or connection engine 110 of the conversational system is one of the modules that plays a role in comprehending user input to offer a directed response. The relationship engine could be implemented in many ways, a graph data structure being one instance so that the present disclosure sometimes refers to the relationship engine by the name "graph engine" herein. The graph engine evaluates the user input in the backdrop of known weighted connections between entities.

In a graph data structure, entities are represented in nodes and relationships are represented in edges in the entity relationship graph. Each edge connects two nodes that are directly related (i.e., that are frequently associated with each other). For example, "Boston" and "Red Sox" may be directly related by a relationship called "sports team." Also, "New York" and "financial district" may be directly related by a neighborhood relationship. The motivation for specifically employing the graph model is the observation that relevance, proximity, and relatedness in natural language conversation can be modeled simply by notions such as link-distance and, in some cases, shortest paths and smallest weight trees.

During conversation when a user dialog involves other entities related to the actually sought entities, a subroutine addressing information retrieval as a simple graph search problem effectively helps reduce dependence on deep unambiguous comprehension of sentence structure. Such an approach offers system implementation benefits. Even if the user intent calculation is ambiguous or inconclusive, so long as entities have been recognized in the user utterance, a graph-interpretation based treatment of the problem enables a system to respond in a much more intelligible manner than otherwise possible.

Implicit and explicit semantic relationships and links are created among members of the information repository itself, by performing statistical text processing, link analysis and analyses of other signals (e.g., location information, etc.) on the metacontent available for the named entities. These relationships are always evolving, and over time are enhanced by aggregate usage analytics, collaborative filtering and other techniques.

Each named entity in an information repository is represented as a vector of weighted text-phrases (terms), in a manner similar to the way textual information retrieval work represents documents as a vector of weighted text-phrases. Traditional simple "tf-idf" (term frequency/inverse document frequency) based approaches alone are not adequate for the present systems and methods in many important cases. The weight computation in the vector representation of named entities is designed to take advantage of many more information signals present in the way the text phrases are displayed, the positions of the text phrases within text descriptions of various kinds, and also the structural and positional properties of hyperlinks associated with text phrases. The weight computation is therefore based on a richer statistical and structural analysis of the textual, hyperlinking and other properties and relationships mined from metacontent in the information repository.

For example, two entities that are more frequently associated with each other might have a stronger relationship than two other entities. Boston and Red Sox may have a stronger relationship than Boston and the Common because people use, in their speech, the entities Boston and Red Sox together more often than Boston and the Common. The weighted relationships can be represented in the entity relationship graph. In some embodiments, edges have longer or shorter lengths to represent the weights. Alternatively, edges may have different widths corresponding to the weights. In other embodiments, relationship values can be assigned to the edges. A stronger relationship may be represented with a smaller relationship value.

Explicit Connection Oriented Constraints

What follows are examples of explicit connection-oriented constraints employed in information retrieval systems. Graph model terminology of nodes and edges can also be used to describe connection-oriented constraints as can the terminology of entities and relationships.

Figure 2:
FIG. 2 illustrates an example interface known in the art that employs explicit connected node constraints during information retrieval.

FIG. 2 illustrates an example interface 200 known in the art that employs explicit connected node constraints during information retrieval, in accordance with some embodiments. When using an attribute-only constraints interface, the user only specifies type and attribute constraints on intent entities. Meanwhile, when using an explicit connected node constraints interface, the user can additionally specify the type and attribute constraints on other nodes connected to the intent nodes via specified kinds of edge connections. One example of an interface known in the art that employs explicit connected node constraints during information retrieval is Movie/TV information search engine 200.

Considering that the number of possible death and birth places 205 across all movie and TV personalities is a huge number, birth and death places are treated as nodes rather than attributes in the movie information repository graph. Thus, birth and death place specifications in graphical user interface 200 are specifications for nodes connected to the intended personality node. The filmography filter 210 in the graphical user interface 200 allows a user to specify the name of a movie or TV show node, etc., which is again another node connected to the intended personality node. The other filters 300 (shown in FIG. 3) of graphical user interface 200 are specifiers of the attributes of the intended node.

In the first part of graphical user interface 200, a user may specify two movie or TV show nodes when his intent is to get the personalities who collaborated on both these nodes. In the second part of the graphical UI above, a user may specify two personality nodes when his intent is to get movie or TV show nodes corresponding to their collaborations. In both cases, the user is specifying connected nodes other than his intended nodes, thereby making this an explicit connected node constraint. However, the interfaces known in the art do not support certain types of explicit connected node constraints (explicit connection-oriented constraints), as described below.

Figure 4:
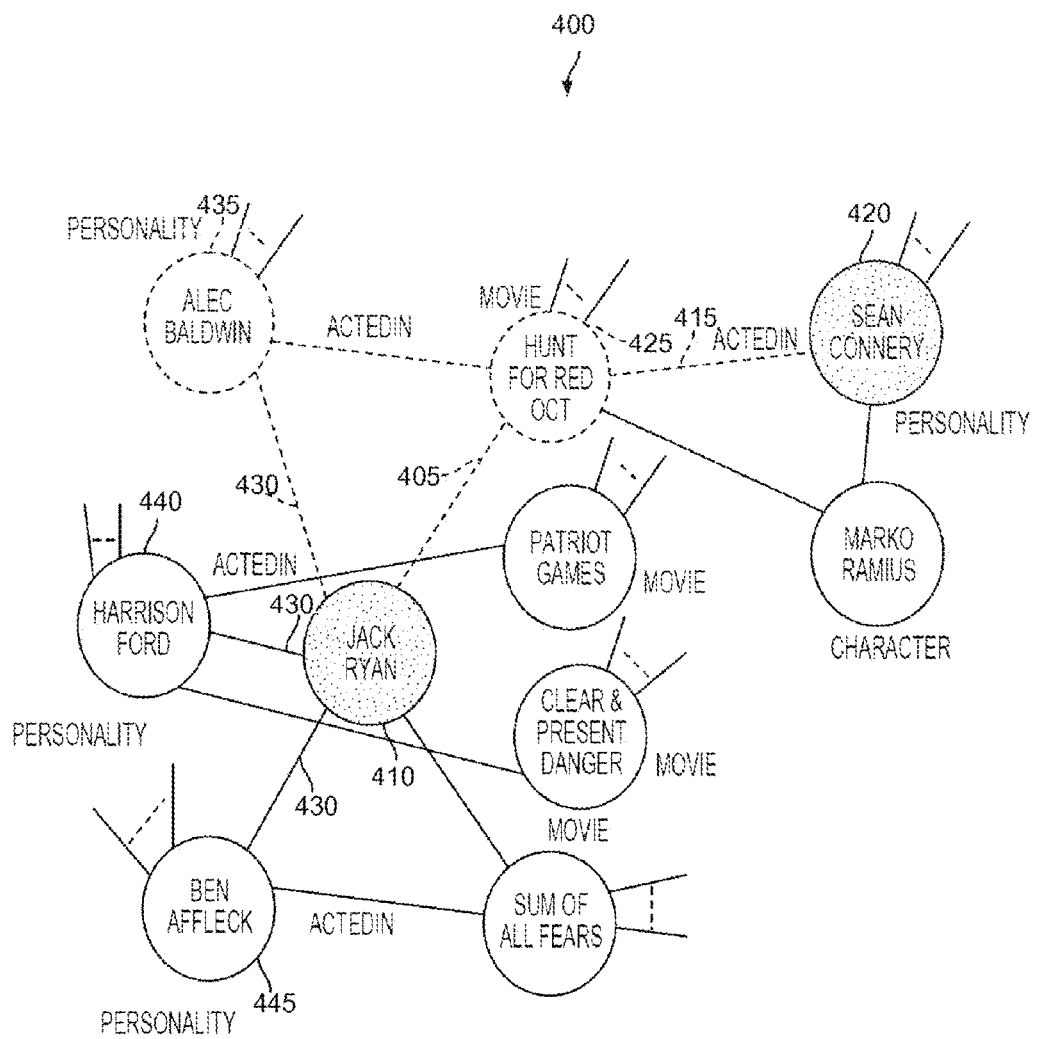
FIGS. 4-7 illustrate examples of graphs that represent entities and relationships between entities, in accordance with some embodiments.

FIG. 4 illustrates an example graph 400 of nodes (entities) and edges (relationships) analyzed by the present techniques to arrive at the desired result, in accordance with some embodiments. For example, the user seeks a movie based on the fictional character Jack Ryan, which also stars Sean Connery. The user may provide the query, "What movie has Jack Ryan and stars Sean Connery?" The techniques herein interpret the query, in view of the structured information repositories as: Get the node of type Movie (intent) that is connected by an edge 405 to the explicit node of type Role named "Jack Ryan" 410 and also connected via an "Acted In" edge 415 to the explicit node of type Personality named "Sean Connery" 420. The techniques described herein return the movie "The Hunt for the Red October" 425 as a result.

Referring again to FIG. 4, assume the user asks, "Who are all of the actors that played the character of Jack Ryan?" The disclosed techniques would interpret the query as:

Get nodes of type Personality (intent) connected by means of an "Acted-as" edge 430 to the explicit node of type Role named "Jack Ryan" 410. Embodiments of the inventive systems disclosed herein would return the actors "Alec Baldwin" 435, "Harrison Ford" 440, and "Ben Affleck" 445.

A further example is a user asking for the name of the movie starring Tom Cruise based on a John Grisham book. Thus, the query becomes: Get the node of type Movie (intent) connected by an "Acted In" edge to the explicit node of type Personality named Tom Cruise and connected by a "Writer" edge to the explicit node of type Personality named "John Grisham." Embodiments of the inventive systems disclosed herein would return the movie "The Firm."

Implicit Connection Oriented Constraints

The following examples illustrate the implicit connection oriented constraints and implicit entities used for specific information retrieval goals. The first two examples used the terminology of entities and relationships.

Figure 5:
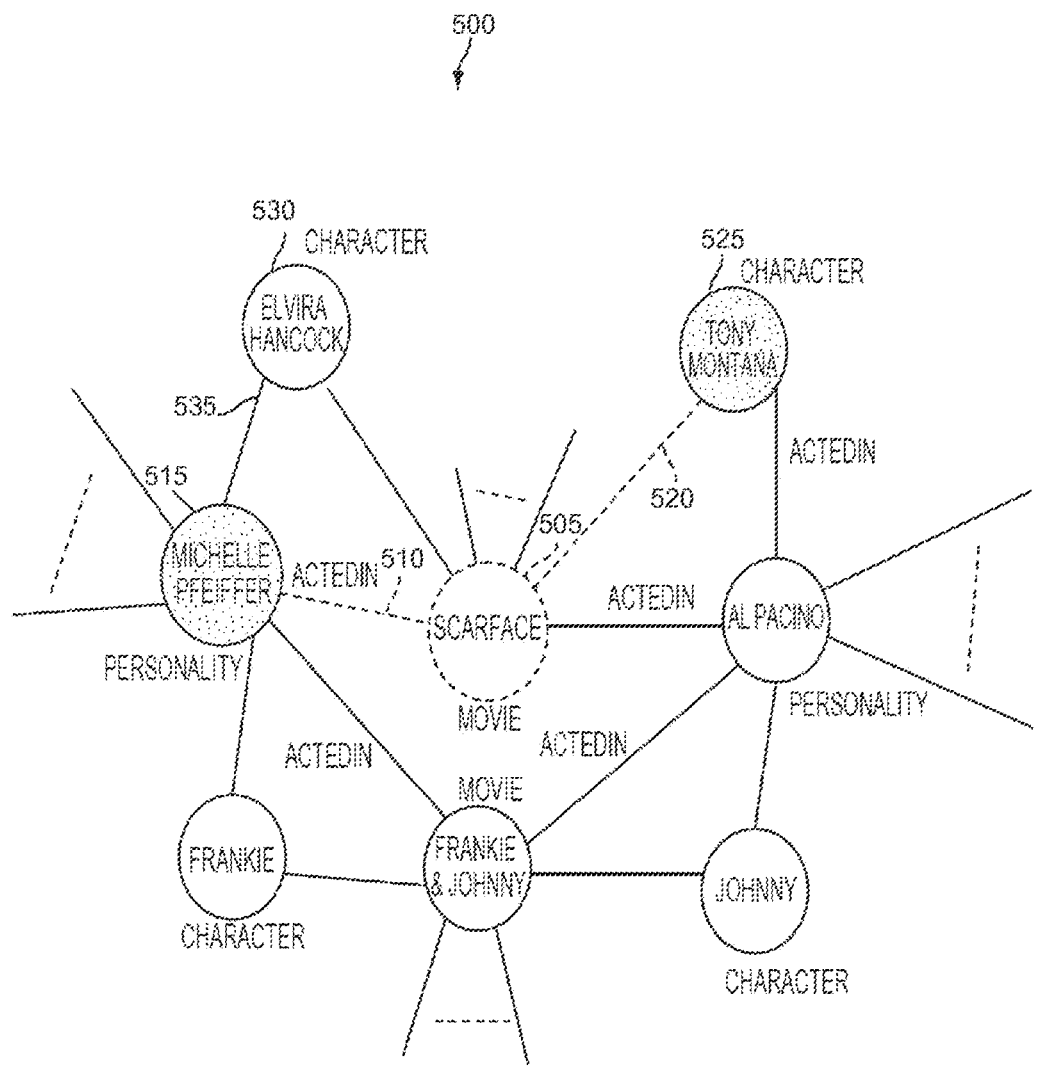

FIG. 5 illustrates an example graph 500 of entities and relationships analyzed by the techniques disclosed herein to arrive at a desired result, in accordance with some embodiments. In one example, the user wants the role (intent) played by a specified actor/personality (e.g., Michelle Pfeiffer) in an unspecified movie that is about a specified role (e.g., the character Tony Montana.) In this case, the user's constraint includes an unspecified or implicit entity. The implicit entity is the movie "Scarface." Graph 500 is an illustrative visual representation of a structured information repository. Specifically, the implicit movie entity "Scarface" 505 is arrived at via a "Acted In" relationship 510 between the movie entity "Scarface" 505 and the actor entity "Michelle Pfeiffer" 515 and a "Character In" relationship 520 between the character entity "Tony Montana" 525 and the movie entity "Scarface" 505. The role entity "Elvira Hancock" 530 played by "Michelle Pfeiffer" is then discovered by the "Acted by" relationship 535 to "Michelle Pfeiffer" and the "Character In" relationship 540 to the movie entity "Scarface" 505.

Figure 6:
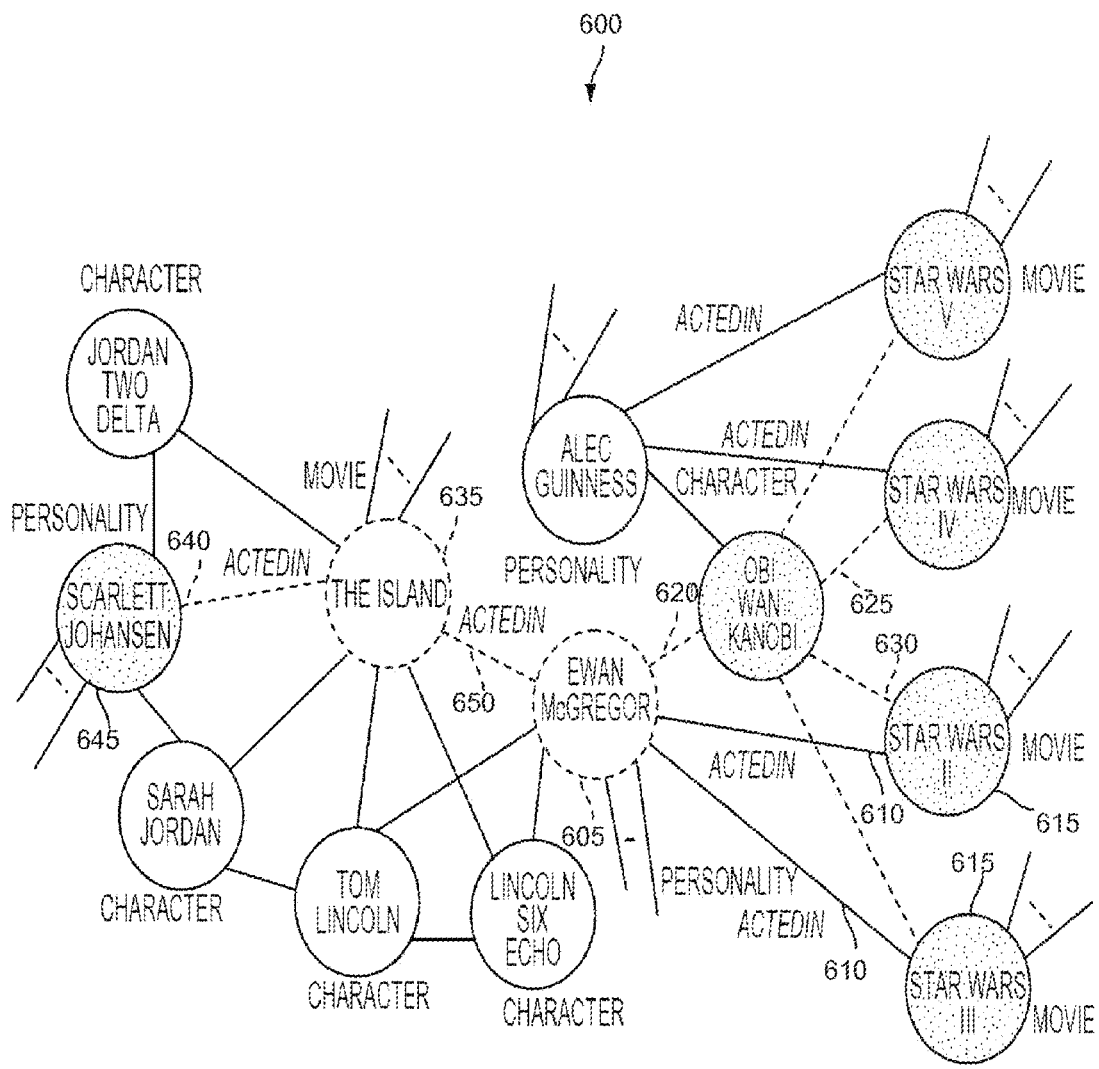

FIG. 6 illustrates an example graph 600 of entities and relationships analyzed by the present techniques to arrive at a desired result, in accordance with some embodiments. In a further example, suppose that the user wants the movie (intent) starring the specified actor entity Scarlett Johansson and the unspecified actor entity who played the specified role of Obi-Wan Kenobi in a specified movie entity Star Wars. In this case, the implicit entity is the actor entity "Ewan McGregor" and the resulting entity is the movie "The Island" starring "Scarlett Johansson" and "Ewan McGregor." Specifically, the implicit actor entity Ewan McGregor 605 is arrived at via an Acted In relationship 610 with at least one movie entity Star Wars 615 and via a Character relationship 620 to a character entity Obi-Wan Kenobi 625, which in turn is related via a Character relationship 630 to the movie entity Star Wars 615. Meanwhile, the result entity The Island 635 is arrived at via an Acted In relationship 640 between the actor/personality entity Scarlett Johansson 645 and the movie entity The Island 635 and an Acted In relationship 650 between the implicit actor entity Ewan McGregor 605 and the movie entity The Island.

Figure 7:
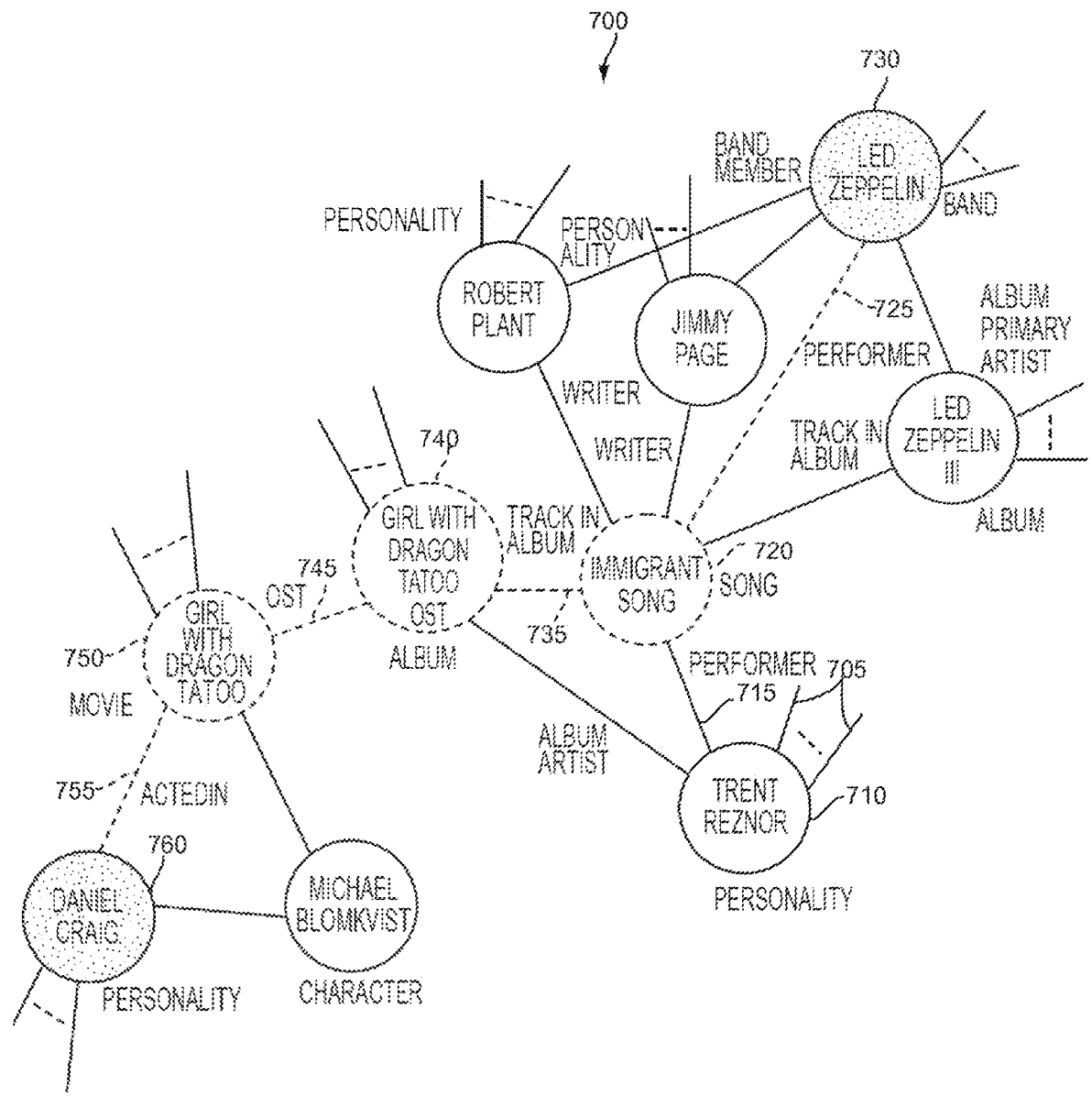

FIG. 7 illustrates an example graph 700 of entities and relationships analyzed by the present techniques to arrive at a desired result, in accordance with some embodiments. This example uses the terminology of nodes and edges. The user knows that there is a band that covered a Led Zeppelin song for a new movie starring Daniel Craig. The user recalls neither the name of the covered song nor the name of the movie, but he wants to explore the other music (i.e., songs) of the band that did that Led Zeppelin cover. Thus, by specifying the known entities of Led Zeppelin (as the song composer) and Daniel Craig (as an actor in the movie), the interposing implied nodes are discovered to find the user's desired result. Thus, embodiments of the inventive techniques herein compose the query constraint as follows: Return the nodes of type Song (intent) connected by a "Composer" edge 705 to an implicit node of type Band 710 (Trent Reznor) such that this Band node has a "Cover Performer" edge 715 with an implicit node of type Song 720 (Immigrant Song) which in turn has a "Composer" edge 725 with an explicit node of type Band named "Led Zeppelin" 730 and also a "Track in Album" edge 735 with an implicit node of type Album 740 (Girl with the Dragon Tattoo Original Sound Track) which has an "Original Sound Track (OST)" edge 745 with an implicit node of type Movie 750 (Girl with the Dragon Tattoo Original Sound Track) that has an "Acted In" edge 755 with the explicit node of type Personality named "Daniel Craig" 760.

As mentioned above, traditional techniques and systems for information retrieval suffer from a variety of problems. Described herein are embodiments of an inventive conversational interaction interface. These embodiments enable a user to interact with an information retrieval system by posing a query and/or instruction by speaking to it and, optionally, selecting options by physical interaction (e.g., touching interface, keypad, keyboard, and/or mouse). Response to a user query may be performed by machine generated spoken text to speech and may be supplemented by information displayed on a user screen. Embodiments of the conversation interaction interface, in general, allow a user to pose his next information retrieval query or instruction in reaction to the information retrieval system's response to a previous query, so that an information retrieval session is a sequence of operations, each of which has the user first posing a query or instruction and the system then presenting a response to the user.

Embodiments of the present invention are a more powerful and expressive paradigm than graphical user interfaces for the query-constraints discussed herein. In many situations, especially when it comes to flexibly selecting from among a large number of possible attributes or the presence of explicit and implicit connected nodes, the graphical user interface approach does not work well or does not work at all. In such cases, embodiments of the conversational interaction interface of the present invention are a much more natural fit. Further, embodiments of the present invention are more scalable in terms of the number of distinct attributes a user may specify as well as the number of explicit connected node constraints and the number of implicit node constraints relative to graphical user interfaces.

Conversation State Space

As illustrated above, an exemplary conversational information retrieval system of the present invention uses a conversation state space.

Figure 8:
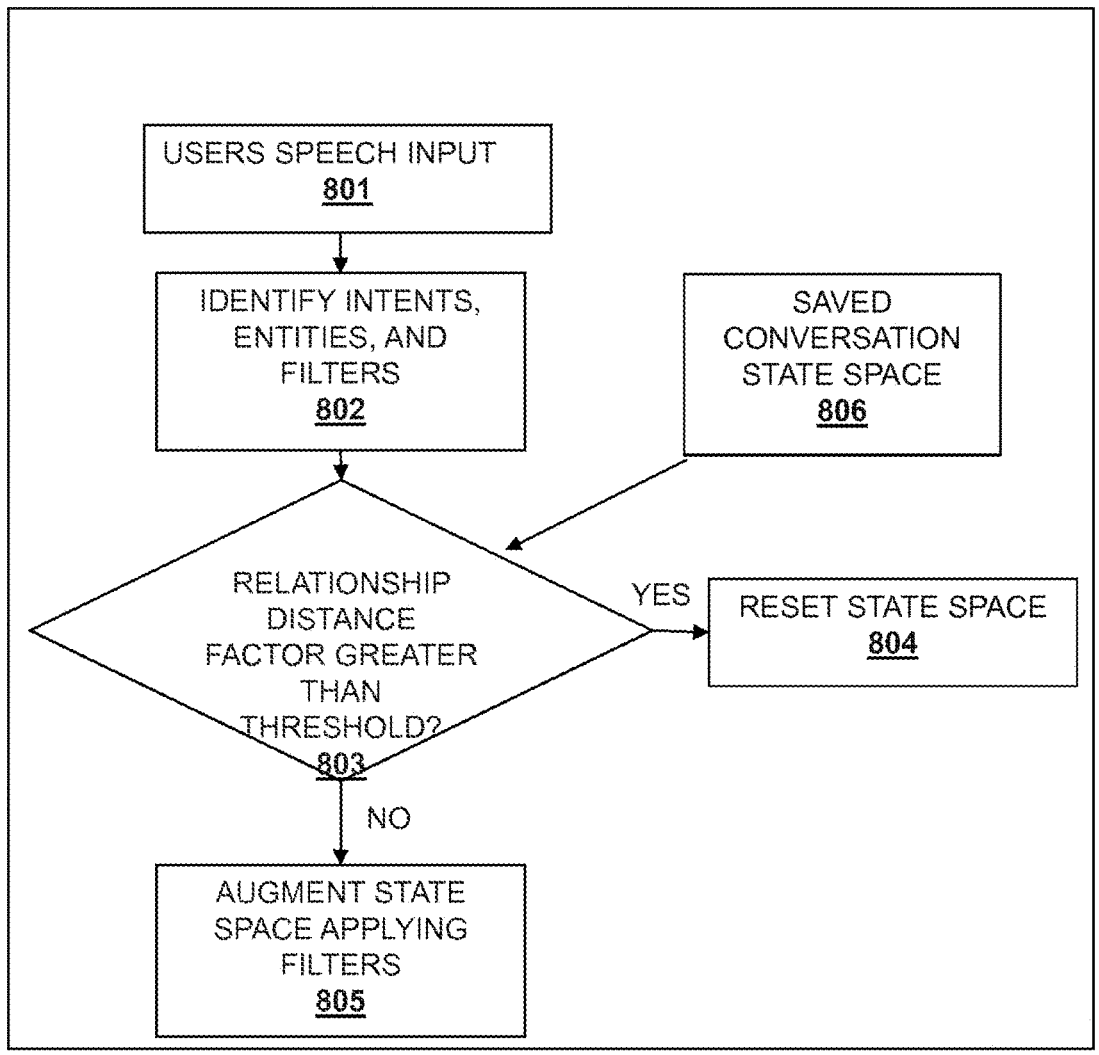
FIG. 8 illustrates the process of modification of the conversation state space when time user interacts with the system, in accordance with some embodiments.

FIG. 8 represents an example process of modification of the conversation state space when the user interacts with the present system, in accordance with some embodiments. The conversation state space is composed of entities and intents on which filters have been applied. The output of speech to text engine 801 is broken into entities, intents and filters 802 as described above. A relationship distance threshold of the currently spoken set of entities from the entities in the saved conversation state space 806 is evaluated 803 making use of graph engine 110 (shown in FIG. 1). For embodiments using an entity relationship graph, the relationship distance can be measured in terms of "hops" between connected nodes. If edges of the entity relationship graph have weights associated with the relationship, the relationship distance can take the weight into consideration. For example, there may be two hops between Red Sox and San Francisco, having an intermediate node of Boston. The relationship value between Red Sox and Boston may be 0.8 and the relationship value between Boston and San Francisco may be 0.5. Then, the relationship distance between Red Sox and San Francisco may be 1.3.

When the entities in the current speech input are removed from the entities in the conversation state space beyond a certain relationship distance, all or a part of the conversation state space is reset 804. The domain of match of the currently input entities determines the active domain specific engine for the subsequent conversation thread. All or part of the state space is reset even if the domain-specific engine for the subsequent conversation thread remains the same (the user still desires a movie, but the subsequent request is not related to the prior request). If the entities in the current speech input are within the threshold relationship distance from the entities in the conversation state space, the conversation state space is augmented 805 with the current entities and the filters in the current input are also applied to the entities and/or intents on which they operate. The techniques for conversation state space management are provided in U.S. patent application Ser. No. 13/801,958, entitled Method for Adaptive Conversation State Management with Filtering Operators Applied Dynamically as Part of a Conversational Interface, filed on Mar. 13, 2013, which is incorporated by reference herein in its entirety.

Whether one or more new entities is too far removed from those in the saved state can be a static number determined based on the nature of the domain. For example, for domains having relatively little branching between nodes, a lower number of hops between nodes would be used as a threshold. Meanwhile, for a domain space with extensive branching, a higher number of hops would be required before reaching a reset threshold. The threshold number can be a static value, or can be adjusted based on monitoring feedback from the user. For example, the threshold may be set at a relatively high value, and can be decreased as the system detects feedback from the user that the system is improperly combining new and old input information.

Furthermore, personalization can be taken into account when determining the relationship distance between saved conversation state. Thus, two nodes (i.e., entities) that are relatively far removed in the entity relationship graph may have a closer connection given a personalization overlay. For example, whenever a user searches for Chicago, he may always search for an airfare to Chicago. In this case, personalization may reduce the relationship distance between the two entities: Chicago and airfare. Thus, personalization introduces "shortcuts" in the graph space given what the system has learned of the user's preferences over time. Conversely, values in the conversation state can be reset by monitoring the "age" of the item—items farther back in time can be automatically reset after a defined period has passed since their use.

A personalization is based on a user preference signature that can be provided by the system using known techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User Interface Methods and Systems for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preferences, issued Feb. 7, 2012, each of which is incorporated by reference herein, can be used with the techniques disclosed herein. However, the personalization, the use of user's preference signatures, and/or information is not limited to the techniques set forth in the incorporated applications.
Implementations The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, and/or mobile computing devices capable of receiving the signals discussed herein can be used in implementations of the invention.

Various aspects and embodiments of the present systems and methods can be used in conjunction with the techniques set forth in the following applications, the entire contents of each of which is incorporated by reference herein:

U.S. patent application Ser. No. 13/667,400, entitled Method of and System for Inferring User Intent in Search Input in a Conversational Interaction System, filed Nov. 2, 2012;

U.S. patent application Ser. No. 13/801,958, entitled Method for Adaptive Conversation State Management with Filtering Operators Applied Dynamically as Part of a Conversational Interface, filed Mar. 13, 2013;

U.S. patent application Ser. No. 12/879,141, entitled Method of and System for Presenting Enriched Video Viewing Analytics, filed Sep. 10, 2010; and U.S. Pat. No. 7,774,294, entitled Methods and Systems for Selecting and Presenting Content Based on Learned Periodicity of User Content Selections issued Aug. 10, 2010.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to

What is claimed is:

1. A computer implemented method comprising:
receiving a first search query and a second search query, wherein one of the first search query or the second search query indicates a window of time during which a user intends to view a media asset;
determining whether any media assets that match the first search query or the second search query are available in the window of time by determining whether any media assets that match the first search query or the second search query are scheduled for delivery during the window of time; and
in response to determining that no media assets that match the first search query or the second search query are available in the window of time:
determining a first set of categories related to the first search query;
determining a second set of categories related to the second search query;
identifying a category that is related to both the first search query and the second search query based on the first set of categories and the second set of categories; and
generating one or more listings for media assets that are scheduled for delivery during the window of time and belong to the identified category.

2. The method of claim 1, wherein identifying the category that is related to both the first search query and the second search query comprises:
calculating one or more distances in a relationship graph between a first attribute of a first search result that matches the first search query and a second attribute of a second search result that matches the second search query;
selecting one or more connections between the first attribute and the second attribute based on the calculated distances; and
identifying the category that is related to both the first search query and the second search query based on the selected connections in the relationship graph.

3. The method of claim 2, wherein the relationship graph has a collection of nodes and edges, the edges representing direct connections between nodes, and wherein each of the calculated distances indicate a distance between two nodes in the relationship graph.

4. The method of claim 3, wherein each of the calculated distances is measured in a number of hops between two nodes.

5. The method of claim 3, wherein each edge has a weight and wherein each of the calculated distances is a combination of weights of edges connecting two nodes.

6. The method of claim 3, wherein the calculated distances are based further on how often the nodes were used together according to historical inputs.

7. The method of claim 2, wherein at least one of the calculated distances is modified by user preferences acquired over time.

8. The method of claim 2, wherein the first attribute comprises a first smart tag, a first category, or a first microcategory, and wherein at least one of the first smart tag, the first category, and the first microcategory are determined by applying a set of predetermined rules to the first search query or by applying a naïve Bayes classifier to the first search query.

9. The method of claim 2, wherein the first attribute comprises a first smart tag, a first category, or a first microcategory, wherein the second attribute comprises a second smart tag, a second category, or a second microcategory, and wherein selecting the one or more connections between one or more of (a) the first smart tag and the second smart tag, (b) the first category and the second category, and (c) the first microcategory and the second microcategory based on the calculated distances comprises:
comparing the calculated distances between one or more of (a) the first smart tag and the second smart tag, (b) the first category and the second category, and (c) the first microcategory and the second microcategory;
determining whether one or more of the calculated distances is within a relationship distance threshold; and
in response to determining that one or more of the calculated distances is within the relationship distance threshold, selecting the one or more connections that are associated with the calculated di stances within the relationship di stance threshold.

10. A system comprising:
an electronic computing device configured to:
receive a first search query and a second search query, wherein one of the first search query or the second search query indicates a window of time during which a user intends to view a media asset;
determine whether any media assets that match the first search query or the second search query are available in the window of time by determining whether any media assets that match the first search query or the second search query are scheduled for delivery during the window of time; and
in response to determining that no media assets that match the first search query or the second search query are available in the window of time:
determine a first set of categories related to the first search query;
determine a second set of categories related to the second search query;
identify a category that is related to both the first search query and the second search query based on the first set of categories and the second set of categories; and
generating one or more listings for media assets that are scheduled for delivery during the window of time and belong to the identified category.

11. The system of claim 10, wherein the electronic computing device is further configured, when identifying the category that is related to both the first search query and the second search query, to:
calculate one or more distances in a relationship graph between a first attribute of a first search result that matches the first search query and a second attribute of a second search result that matches the second search query;
select one or more connections between the first attribute and the second attribute based on the calculated distances; and
identify the category that is related to both the first search query and the second search query based on the selected connections in the relationship graph.

12. The system of claim 11, wherein the relationship graph has a collection of nodes and edges, the edges representing direct connections between nodes, and wherein each of the calculated distances indicate a distance between two nodes in the relationship graph.

13. The system of claim 12, wherein each of the calculated distances is measured in a number of hops between two nodes.

14. The system of claim 12, wherein each edge has a weight and wherein each of the calculated distances is a combination of weights of edges connecting two nodes.

15. The system of claim 12, wherein the calculated distances are based further on how often the nodes were used together according to historical inputs.

16. The system of claim 11, wherein at least one of the calculated distances is modified by user preferences acquired over time.

17. The system of claim 11, wherein the first attribute comprises a first smart tag, a first category, or a first microcategory, and wherein at least one of the first smart tag, the first category, and the first microcategory are determined by applying a set of predetermined rules to the first search query or by applying a naïve Bayes classifier to the first search query.

18. The system of claim 11, wherein the first attribute comprises a first smart tag, a first category, or a first microcategory, wherein the second attribute comprises a second smart tag, a second category, or a second microcategory, and wherein the electronic computing device is further configured, when selecting the one or more connections, to:
  compare the calculated distances between one or more of (a) the first smart tag and the second smart tag, (b) the first category and the second category, and (c) the first microcategory and the second microcategory;
  determine whether one or more of the calculated distances is within a relationship distance threshold; and
  in response to determining that one or more of the calculated distances is within the relationship distance threshold, select the one or more connections that are associated with the calculated distances within the relationship distance threshold.

19. A non-transitory machine-readable medium comprising non-transitory machine-readable instructions encoded thereon, the instructions comprising:
  instructions for receiving a first search query and a second search query, wherein one of the first search query or the second search query indicates a window of time during which a user intends to view a media asset;
  instructions for determining whether any media assets that match the first search query or the second search query are available in the window of time by determining whether any media assets that match the first search query or the second search query are scheduled for delivery during the window of time; and
  instructions for, in response to determining that no media assets that match the first search query or the second search query are available in the window of time:
    determining a first set of categories related to the first search query;
    determining a second set of categories related to the second search query;
    identifying a category that is related to both the first search query and the second search query based on the first set of categories and the second set of categories; and
    generating one or more listings for media assets that are scheduled for delivery during the window of time and belong to the identified category.

20. The non-transitory machine-readable medium of claim 19, the non-transitory machine-readable medium further comprises instructions, identifying the category that is related to both the first search query and the second search query, for:
  calculating one or more distances in a relationship graph between a first attribute of a first search result that matches the first search query and a second attribute of a second search result that matches the second search query;
  selecting one or more connections between the first attribute and the second attribute based on the calculated distances; and
  identifying the category that is related to both the first search query and the second search query based on the selected connections in the relationship graph.

* * * * *

UNITED STATES PATENT AND TRADEMARK OFFICE
CERTIFICATE OF CORRECTION

PATENT NO. : 12,169,496 B2
APPLICATION NO. : 17/122347
DATED : December 17, 2024
INVENTOR(S) : Murali Aravamudan et al.

Page 1 of 1

It is certified that error appears in the above-identified patent and that said Letters Patent is hereby corrected as shown below:

In the Claims

Claim 9, Column 22, Line 20, change "di stances" to --distances--

Claim 9, Column 22, Line 21, change "di stance" to --distance--

Signed and Sealed this
Fourth Day of February, 2025

Coke Morgan Stewart
*Acting Director of the United States Patent and Trademark Office*